United States Patent Office 2,987,519
Patented June 6, 1961

2,987,519
3-ALKYL - 4,4 - BIS(HYDROXYMETHYL)-OXAZOLIDINES AND PROCESS FOR THE PREPARATION THEREOF
Bernard L. Zenitz, Colonie, N.Y., assignor to Sterling Drug Inc., New York, N.Y., a corporation of Delaware
No Drawing. Filed Nov. 9, 1959, Ser. No. 851,511
7 Claims. (Cl. 260—307)

This invention relates to 3-alkyl-4,4-bis(hydroxymethyl)oxazolidines having the formula

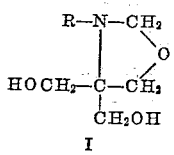

I where R represents an alkyl group having from six to twenty carbon atoms.

The compounds of Formula I have been shown to possess valuable antibacterial, antiviral and antifungal properties. These activities indicate their usefulness as bactericidal, viricidal and fungicidal agents.

The compounds of Formula I are also useful as intermediates in the preparation of N,N-dialkyl-N-[tris(hydroxymethyl)methyl]amines wherein the N,N-dialkyl groups have a total of between twelve and twenty carbon atoms, inclusive and which also possess antibacterial and antiviral properties. The N,N-dialkyl-N-[tris(hydroxymethyl)methyl]amines are claimed in my parent application Serial No. 610,407, filed September 17, 1956, now U.S. Patent 2,885,441.

The N,N - dialkyl - N - [tris(hydroxymethyl)methyl]-amines are represented by the formula

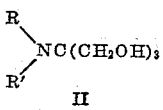

II

When the compounds of Formula II are prepared from the compounds of the instant invention, R represents an alkyl group having from six to twenty carbon atoms, inclusive, R' represents an alkyl group having from two to fourteen carbon atoms, inclusive, and the sum of the number of carbon atoms in R and R' is between twelve and twenty, inclusive.

The exact nature of the alkyl groups represented by R and R' in Formulas I and II is not critical, the only critical feature being the total carbon content of the molecule. Thus R' in representing an alkyl group can be any of such straight or branched chain groups as ethyl, propyl, isopropyl, butyl, isobutyl, secondary-butyl, tertiary-butyl, pentyl, isopentyl, hexyl, isohexyl, heptyl, octyl, isooctyl, nonyl, decyl, undecyl, dodecyl, tridecyl, tetradecyl, and the like. Likewise R in representing an alkyl group of six to twenty carbon atoms can be any of such groups as hexyl, isohexyl, 2-methylpentyl, heptyl, isoheptyl, octyl, isooctyl, nonyl, decyl, undecyl, dodecyl, tridecyl, tetradecyl, pentadecyl, hexadecyl, heptadecyl, octadecyl, nonadecyl, eicosyl, and the like.

The compounds of Formula I are prepared by reaction of formaldehyde with an N-alkyl-N-[tris(hydroxymethyl)methyl]amine, $RNHC(CH_2OH)_3$, where R has the meaning given above. The reaction is preferably carried out by heating the formaldehyde and amine at a temperature in the range from about 70° C. to about 150° C. in an organic solvent inert under the conditions of the reaction and with means for separating the water formed in the reaction. Suitable solvents are benzene, toluene, xylene, and the like. A preferred solvent is benzene.

The N - alkyl - N - [tris(hydroxymethyl)methyl]amines used as starting material can, in turn, be prepared by alkylation of tris(hydroxymethyl)methylamine with an alkylating agent such as alkyl esters of strong acids. Preferred alkylating agents are alkyl halides, alkyl sulfates and alkyl p-toluenesulfonates. The reaction is preferably carried out in the presence of an acid-acceptor in an organic solvent inert under the conditions of the reaction, for example, methanol, ethanol, n-butanol, and the like. The purpose of the acid-acceptor is to take up the hydrogen halide, sulfuric acid, alkyl sulfonic acid or p-toluenesulfonic acid which are split out during the course of the reaction and includes such substances as alkali metal carbonates, for example sodium or potassium carbonate, or alkali metal hydroxides, for example sodium hydroxide or potassium hydroxide, and the like.

The compounds of Formula II are prepared by reacting either compounds of Formula I or 5-hydroxymethyl-1-aza-3,7-dioxabicyclo[3.3.0]octane of Formula III

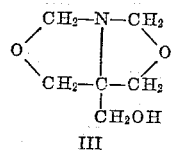

III with a Grignard reagent R″Mg-halide. In the Grignard reagent, R″—Mg-halide, R″ represents an alkyl group having one less carbon atom than the alkyl group R′ to be introduced in forming compounds of Formula II. The halide is preferably bromide or iodide. If the intermediate III is used, symmetrical compounds of the formula $(R)_2NC(CH_2OH)_3$, where both N-alkyl groups are identical are produced. If compounds of Formula I are used, compounds of the formula $RR'NC(CH_2OH)_3$, where R and R' can be the same or different, are produced.

The reaction of R″Mg-halide with compounds of Formula I or III is carried out under conditions used for Grignard type reactions, for example, in anhydrous ether or tetrahydrofuran medium.

The compounds of my invention are useful in the free base form or in the form of acid-addition salts, and both forms are within the purview of the invention and, in fact, are considered to be one and the same invention. The acid-addition salts are simply a more convenient form for use, and in practice, use of the salt form inherently amounts to use of the base form and vice versa. As used in the appended claims, unless specifically designated otherwise, reference to the structure of Formula I or the term 3-alkyl-4,4-bis(hydroxymethyl)oxazolidine means in either case both the free base form and the acid-addition salt form of the molecular structure recited.

The preferred acid-addition salts are those which are appreciably water-soluble so that they may be prepared for use in aqueous solution. Appropriate acid-addition salts are those derived from mineral acids such as hydrochloric acid, hydrobromic acid, hydriodic acid, nitric-acid, sulfuric acid and phosphoric acid; and organic acids such as acetic acid, citric acid, lactic acid, tartaric acid, methanesulfonic acid, benzenesulfonic acid, p-toluenesulfonic acid, sulfamic acid and quinic acid.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

The compounds of Formula I have been found to possess bactericidal activity against such organisms as *Staphylococcus aureus, Eberthella typhi, Pseudomonas aeruginosa, Clostridium welcheii, Mycobacterium tuberculosis*, and the like; vericidal activity against such species as feline pneumonitis virus, rabies virus, canine distemper virus, meningopneumonitis virus, and the like; and antifungal activity against such genera as *Aspregillus niger*, *Trichophyton mentagrophytes*, *Trichophyton gypseum*, and the like.

The bactericidal activity was determined in vitro by measuring the minimal concentration necessary to kill the bacteria in 10 minutes, and it was found that the compounds were effective in dilutions ranging from 1:1000 to 1:200,000. They were effective either when dissolved in acid solution, such as aqueous acetic, propionic, quinic or phthalic acids, or when dispersed in neutral aqueous medium by means of a surface active agent.

The viricidal activity was determined by treating live virus in vitro with a solution of the compound in aqueous acid or alcoholic solution containing 0.5% bovine albumin, then injecting the solution into a susceptible animal species such as the mouse or the chick embryo, and observing whether disease developed. The compounds of Formula I were found to be effective at dilutions of 1:2500 to 1:20,000.

The antifungal activity was determined by standard serial dilution tests. The compounds of Formula I were found to be fungicidally effective at dilutions of 1:1,000 to 1:10,000.

The compounds are prepared for use as antibacterial agents by preparing a dilute solution in aqueous acid or a neutral solution which may contain a surfactant, and are applied to a surface to be disinfected by conventional means such as spraying, swabbing, immersion, and the like. In such cases when the compounds are to be used externally, toxic acid-addition salts can be used.

When used as antifungal agents, they are preferably employed topically, and they can be compounded with conventional excipients and used in the form of a powder, a liquid, an ointment, a salve, or any other vehicular form suitable for administering anti-fungal agents.

When used as antiviral agents, they are prepared for use in the form of solutions or suspensions in pharmaceutically acceptable liquid media for parenteral administration, or in powder or tablet form with conventional excipients for oral administration.

The structures of my 3-alkyl-4,4-bis(hydroxymethyl)-oxazolidines are established by their mode of synthesis and corroborated by the correspondence of calculated and found values for the elementary analyses for representative examples.

The following examples will further illustrate the invention without limiting the same thereto.

*Example 1*

*N,N-dioctyl-N-[tris(hydroxymethyl)methyl]amine* [II; R and R' are $CH_3(CH_2)_7$].—n-Heptylmagnesium bromide was prepared from 17.5 g. (0.72 mole) of magnesium and 129.0 g. (0.72 mole) of n-heptyl bromide in 600 ml. of anhydrous ether, using a crystal of iodine to initiate the reaction. After the preparation of the Grignard reagent was completed, 29.0 g. (0.20 mole) of 5-hydroxymethyl - 1 - aza-3,7-dioxabicyclo[3.3.0]octane in 700 ml. of dry ether was added over a period of forty minutes at such a rate as to maintain reflux. The reaction mixture was then refluxed for six hours and allowed to stand at room temperature for about fifteen hours. There was then added dropwise with stirring a solution of 72 g. of concentrated sulfuric acid in 200 ml. of water. The ether layer was separated and washed with two 500 ml. portions of 5% sulfuric acid. The first sulfuric acid extraction caused the formation of an intermediate third layer comprising the insoluble tertiary amine sulfate which was separated and dissolved in chloroform. Concentrated ammonium hydroxide was added to neutralize the sulfate, and the chloroform solution was washed with ammonium hydroxide and dried over anhydrous calcium sulfate. The chloroform solution was concentrated in vacuo and the residue crystallized from 150 ml. of dry acetone, and then recrystallized from 70 ml. of methanol, giving 41.6 g. of N,N-dioctyl-N-[tris(hydroxymethyl)methyl]amine, M.P. 38.5–40° C. (uncorr.).

*Analysis.*—Calcd. for $C_{20}H_{43}NO_3$: C, 69.52; H, 12.54. Found: C, 69.66; H, 12.32.

N,N - dioctyl - N-[tris(hydroxymethyl)methyl]amine was found to be bactericidally effective at a dilution of 1:30,000 vs. *Staphylococcus aureus* and 1:60,000 vs. *Eberthella typhi*.

*Example 2*

*N,N-dionyl-N-[tris(hydroxymethyl)methyl]amine* [II; R and R' are $CH_3(CH_2)_8$] was obtained from 9.40 g. of magnesium, 75.0 g. of n-octyl bromide and 14.5 g. of 5-hydroxymethyl - 1-aza-3,7-dioxabicyclo[3.3.0]octane according to the manipulative procedure described above in Example 1. There was thus obtained 25.7 g. of N,N-dinonyl - N - [tris(hydroxymethyl)methyl]amine, M.P. 43.5–46° C. (uncorr.), when recrystallized first from acetone and then from ethanol.

*Analysis.*—Calcd. for $C_{22}H_{47}NO_3$: C, 70.73; H, 12.69. Found: C, 70.90; H, 12.52.

N,N - dinonyl - N-[tris(hydroxymethyl)methyl]amine was found to be bactericidally effective at a dilution of 1:30,000 vs. *Staphylococcus aureus* and 1:100,000 vs. *Eberthella typhi*.

N,N - dinonyl - N-[tris(hydroxymethyl)methyl]amine was found to be soluble in aqueous acetic, propionic, quinic and phthalic acids to produce solutions of the acetate, propionate, quinate, and phthalate salts, respectively.

*Example 3*

*N,N-dihexyl-N-[tris(hydroxymethyl)methyl]amine* [II; R and R' are $CH_3(CH_2)_5$] was prepared from 8.1 g. (0.33 mole) of magnesium, 50.0 g. (0.33 mole) of n-pentyl bromide and 14.5 g. (0.10 mole) of 5-hydroxymethyl-1-aza-3,7-dioxabicyclo[3.3.0]octane according to the manipulative procedure described above in Example 1. The reaction mixture was treated cautiously with 350 ml. of 10% ammonium chloride solution, stirred for one-half hour, the water layer separated, and the solid material suspended therein was collected by filtration and washed with ether. The combined ether layer and washings were dried over anhydrous calcium sulfate and concentrated, the residue was recrystallized from 50 ml. of acetone, giving 12.95 g. of N,N-dihexyl-N-[tris(hydroxymethyl)methyl]amine, M.P. 67–68.5° C. (corr.).

*Analysis.*—Calcd. for $C_{16}H_{35}NO_3$: C, 66.39; H, 12.19; N, 4.84. Found: C, 66.61; H, 12.24; N, 4.82.

N,N-dihexyl-N-[tris(hydroxymethyl)methyl]amine was found to be bactericidally effective at a dilution of 1:1,000 vs. *Staphylococcus aureus* and *Eberthella typhi*, whereas the lower homologous N,N-dipentyl-N-[tris(hydroxymethyl)methyl]amine was devoid of activity at concentrations ten times as great, i.e., at a dilution of 1:100.

*Example 4*

(a) *3 - tetradecyl-4,4-bis(hydroxymethyl)oxazolidine* [I; R is $CH_3(CH_2)_{13}$].—A mixture of 15.88 g. (0.050 mole) of N-tetradecyl-N-[tris(hydroxymethyl)methyl]-amine and 1.72 g. (0.0575 mole) of paraformaldehyde in 100 ml. of dry benzene was refluxed for about three hours, using a water separator to remove the water formed in the reaction. The reaction mixture was concentrated, and the residue recrystallized twice from hexane, giving 14.65 g. of 3-tetradecyl-4,4-bis(hydroxymethyl)oxazolidione, M.P. 48.0–49.5° C. (corr.).

*Analysis.*—Calcd. for $C_{19}H_{39}NO_3$: C, 69.24; H, 11.93; N, 4.25. Found: C, 69.50; H, 11.55; N, 4.23.

3-tetradecyl - 4,4 - bis(hydroxymethyl)oxazolidine was found to be bactericidally effective at a dilution of 1:10,000 vs. *Staphylococcus aureus* and *Eberthella typhi*.

(b) *N - tetradecyl - N - butyl-N-[tris(hydroxymethyl)-methyl]amine* [II; R is $CH_3(CH_2)_{13}$, R' is $CH_3(CH_2)_3$].—n-Propylmagnesium bromide was prepared from 3.10 g. (0.128 mole) of magnesium and 15.90 g. (0.128 mole) of n-propyl bromide in 100 ml. of absolute ether, using a crystal of iodine to initiate the reaction. After the preparation of the Gringnard reaction was complete, 11.65 g. (0.0355 mole) of 3-tetradecyl-4,4-bis(hydroxymethyl)-oxazolidine in 150 ml. of absolute ether was added over a period of one-half hour. Tetrahydrofuran (25 ml.) was then added, and the reaction mixture was refluxed for about seven hours. There was then added gradually 150 ml. of 10% ammonium chloride solution, and the resulting solid material was collected by filtration. The filtrate was extracted three times with chloroform. The solid was dissolved in about 200 ml. of water containing 13.2 g. of concentrated sulfuric acid, the solution filtered and the filtrate extracted three times with chloroform. The chloroform extracts were washed with dilute ammonium chloride solution and dried over anhydrous calcium sulfate. The total chloroform extracts were concentrated to dryness and the residues recrystallized from pentane, giving N-tetradecyl-N-butyl-N-[tris(hydroxymethyl)methyl]-amine, MP. 48.5–50° C. (corr.).

Analysis.—Calcd. for $C_{22}H_{47}NO_3$: C, 70.73; H, 12.69; N, 3.75. Found: C, 70.82; H, 12.65; N, 3.69.

N - tetradecyl - N - butyl - N - [tris(hydroxymethyl)-methyl]amine was found to be fungicidally effective at a dilution of 1:100,000 vs. *Trichophyton mentagrophytes* and 1:10,000 vs. *Aspergillus niger* and *Monilia albicans*.

(c) N - tetradecyl - N-ethyl - N[tris(hydroxymethyl)methyl]amine [II; R is $CH_3(CH_2)_{13}$, R' is $C_2H_5$] was prepared from methyl magnesium iodide [prepared from 3.65 g. (0.150 mole) of magnesium and 21.3 g. (0.150 mole) of methyl iodide in 250 ml. of absolute ether] was reacted with 13.1 g. (0.04 mole) of 3-tetradecyl-4,4-bis-(hydroxymethyl)oxazolidine in 100 ml. of tetrahydrofuran using the manipulative procedure described above in Example 4, part (b). The product was recrystallized from acetone giving 7.8 g. of N-tetradecyl-N-ethyl-N-[tris(hydroxymethyl)methyl]amine, M.P. 55.0–56.6° C. (corr.).

Analysis.—Calcd. for $C_{20}H_{43}NO_3$: N, 4.05; O, 13.89. Found: N, 4.03; O, 14.20.

N - tetradecyl - N - ethyl - N - [tris(hydroxymethyl)-methyl]amine was found to be fungicidally effective at a dilution of 1:100,000 vs. *Trichophyton mentagrophytes* and 1:10,000 vs. *Aspergillus niger* and *Monilia albicans*.

Example 5

(a) 3 - decyl - 4,4 - bis(hydroxymethyl)oxazolidine hydrochloride [I; R is $CH_3(CH_2)_9$] was prepared from 14.2 g. (0.0543 mole) of N-decyl-N-[tris(hydroxymethyl)-methyl]amine and 1.88 g. (0.0625 mole) of paraformaldehyde in 100 ml. of benzene according to the manipulative procedure described above in Example 4, part (a). A sample of the basic product was converted to its hydrochloride salt by treatment with an excess of ethereal hydrogen chloride, giving 3-decyl-4,4-bis(hydroxymethyl)-oxazolidine hydrochloride, M.P. 116–119° C. (corr.).

Analysis.—Calcd. for $C_{15}H_{31}NO_3 \cdot HCl$: C, 58.12; H, 10.41; N, 4.52. Found: C, 58.01; H, 10.40; N, 4.49.

3-decyl-4,4-bis(hydroxymethyl)oxazolidine hydrochloride was found to be bactericidally effective at a dilution of 1:1,000 vs. *Staphylococcus aureus* and *Eberthella typhi*; 1:2,000 vs. *Pseudomonas aeruginosa*; 1:200,000 vs. *Clostridium welcheii*; and 1:40,000 vs. *Mycobacterium tuberculosis* (strain H37Rv).

3-decyl-4,4-bis(hydroxymethyl)oxazolidine can be reacted with hydrobromic acid, hydriodic acid, nitric acid, sulfuric acid, phosphoric acid, acetic acid, citric acid, lactic acid, tartaric acid, methanesulfonic acid, benzenesulfonic acid, p-toluenesulfonic acid, sulfamic acid and quinic acid to give the hydrobromide, hydriodide, nitrate, sulfate (or acid sulfate), phosphate (or acid phosphate), acetate, citrate (or acid citrate), lactate, tartrate (or bitartrate), methanesulfonate, benzenesulfonate, p-toluenesulfonate, sulfamate and quinate salts, respectively.

(b) N - decyl - N - octyl - N - [tris(hydroxymethyl)-methyl]amine [II; R is $CH_3(CH_2)_9$, R' is $CH_3(CH_2)_7$] was prepared from n-heptylmagnesium bromide [derived from 3.23 g. (0.132 mole) of magnesium and 23.8 g. (0.132 mole) of n-heptyl bromide] and 10.12 g. (0.0369 mole) of 3-decyl-4,4-bis(hydroxymethyl)oxazolidine according to the manipulative procedure described above in Example 4, part (b). There was thus obtained about 11.7 g. of N-decyl-N-octyl-N-[tris(hydroxymethyl)methyl]amine in the form of a yellow oil.

Example 6

(a) 3-dodecyl-4,4-bis(hydroxymethyl)oxazolidine hydrochloride [I; R is $CH_3(CH_2)_{11}$] was prepared from 28.9 g. (0.10 mole) of N-dodecyl-N-[tris(hydroxymethyl)methyl]amine and 3.44 g. (0.11 mole) of paraformaldehyde in 200 ml. of benzene according to the manipulative procedure described above in Example 4, part (a). The product was isolated as the hydrochloride salt and recrystallized from acetone giving 22.6 g. of 3-dodecyl-4,4-bis(hydroxymethyl)oxazolidine hydrochloride, M.P. 113.6–118.4° C. (corr.).

Analysis.—Calcd. for $C_{17}H_{35}NO_3 \cdot HCl$: Cl, 10.49; O, 14.20. Found: Cl, 10.46; O, 14.40.

3-dodecyl - 4,4 - bis(hydroxymethyl)oxazolidine hydrochloride was found to be bactericidally effective at a dilution of 1:40,000 vs. *Staphylococcus aureus* and *Clostridium welcheii;* 1:1,000 vs. *Pseudomonas aeruginosa;* 1:20,000 vs. *Eberthella typhi;* and 1:200,000 vs. *Mycobacterium tuberculosis* (strain H37Rv.).

3-dodecyl - 4,4 - bis(hydroxymethyl)oxazolidine hydrochloride was found to be fungicidally effective at a dilution of 1:10,000 vs. *Trichophyton mentagrophytes*, *Trichophyton gypseum* and *Aspergillus niger*.

(b) N - dodecyl - N - ethyl - N - [tris(hydroxymethyl)methyl]amine [II; R is $CH_3(CH_2)_{11}$, R' is $C_2H_5$] was prepared from methyl magnesium iodide [derived from 3.94 g. (0.162 mole) of magnesium and 23.0 g. (0.162 mole) of methyl iodide] and 14.6 g. (0.043 mole) of 3-dodecyl-4,4-bis(hydroxymethyl)oxazolidine hydrochloride according to the manipulative procedure described above in Example 4, part (b). There was thus obtained 2.8 g. of N-dodecyl-N-ethyl - N - [tris(hydroxymethyl)methyl]-amine, M.P. 47.4–50.2° C. (corr.).

Analysis.—Calcd. for $C_{18}H_{39}NO_3$: C, 68.08; H, 12.38; N, 4.41. Found: C, 68.00; H, 12.66; N, 4.38.

Example 7

(a) 3-hexadecyl-4,4-bis(hydroxymethyl)oxazolidine [I; R is $CH_3(CH_2)_{15}$] was prepared from 17.3 g. (0.05 mole) of N-hexadecyl - N - [tris(hydroxymethyl)methyl]amine and 1.72 g. (0.058 mole) of paraformaldehyde in 100 ml. of benzene according to the manipulative procedure described above in Example 4, part (a). The product was isolated as the free base and recrystallized from hexane giving 13.8 g. of 3-hexadecyl-4,4-bis(hydroxymethyl)-oxazolidine, M.P. 56.4–59.2° C. (corr.).

Analysis.—Calcd. for $C_{21}H_{43}NO_3$: C, 70.53; H, 12.12; N, 3.92. Found: C, 70.75; H, 12.33; N, 3.90.

3-hexadecyl - 4,4 - bis(hydroxymethyl)oxazolidine was found to be bactericidally effective at a dilution of 1:10,000 vs. *Staphylococcus aureus* and *Eberthella typhi* and 1:100,000 vs. *Mycobacterium tuberculosis* (strain H37-Rv).

(b) N - hexadecyl - N - ethyl-N-[tris(hydroxymethyl)-methyl]amine [II; R is $CH_3(CH_2)_{15}$, R' is $C_2H_5$] was prepared from methyl magnesium iodide [derived from 4.05 g. (0.167 mole) of magnesium and 22.7 g. (0.167 mole) of methyl iodide] and 15.9 g. of 3-hexadecyl-4,4-bis(hydroxymethyl)oxazolidine according to the manipulative procedure described above in Example 4, part (b). The product was isolated as the free base and recrystallized from acetone giving 6.4 g. of N-hexadecyl-N-ethyl-N-[tris(hydroxymethyl)methyl]amine, M.P. 57.2–61.2° C. (corr.).

Analysis.—Calcd. for $C_{22}H_{47}NO_3$: N, 3.75; O, 12.84. Found: N, 3.69; O, 12.90.

N - hexadecyl - N - ethyl - N - [tris(hydroxymethyl)-methyl]amine was found to be fungicidally effective at a dilution of 1:100,000 vs. *Trichophyton mentagrophytes* and 1:10,000 vs. *Aspergillus niger* and *Monilia albicans*.

Example 8

(a) *3-octadecyl-4,4-bis(hydroxymethyl)oxazolidine* [I; R is $CH_3(CH_2)_{17}$] was prepared from 31.6 g. (0.085 mole) of N-octadecyl-N-[tris(hydroxymethyl)methyl]-amine and 2.92 g. (0.097 mole) of paraformaldehyde in 200 ml. of dry benzene according to the manipulative procedure described above in Example 4, part (a). The product was isolated as the free base and recrystallized from acetone giving 29.4 g. of 3-octadecyl-4,4-bis(hydroxymethyl)oxazolidine, M.P. 58.2–60.0° C. (corr.).

*Analysis.*—Calcd. for $C_{23}H_{47}NO_3$: C, 71.63; H, 12.28; N, 3.63. Found: C, 71.82; H, 12.38; N, 3.53.

3-octadecyl - 4,4 - bis(hydroxymethyl)oxazolidine was found to be bactericidally effective at a dilution of about 1:10,000 vs. *Staphylococcus aureus*, *Eberthella typhi* and *Pseudomonas aeruginosa*; 1:100,000 vs. *Clostridium welcheii*; and about 1:40,000 vs. *Mycobacterium tuberculosis* (strain H37Rv.).

(b) *N - n - octadecyl - N - ethyl - N - [tris(hydroxymethyl)methyl]amine* [II; R is $CH_3(CH_2)_{17}$, R' is $C_2H_5$] was prepared from methyl magnesium iodide [derived from 3.22 g. (0.122 mole) of magnesium and 18.8 g. (0.132 mole) of methyl iodide] and 12.0 g. (0.031 mole) of 3-octadecyl-4,4-bis(hydroxymethyl)oxazolidine according to the manipulative procedure described above in Example 4, part (b). The product was isolated as the free base and recrystallized from ethyl acetate giving 7.3 g. of N - n - octadecyl-N-ethyl-N-[tris(hydroxymethyl)-methyl]amine, M.P. 64.6–67.0° C. (corr.).

*Analysis.*—Calcd. for $C_{24}H_{51}NO_3$: C, 71.78; H, 12.80; N, 3.49. Found: C, 71.36; H, 13.19; N, 3.43.

N - n - octadecyl - N - ethyl - N - [tris(hydroxymethyl)methyl]amine was found to be fungicidally effective at a dilution of 1:10,000 vs. *Trichophyton mentagrophytes* and 1:1,000 vs. *Aspergillus niger* and *Monilia albicans*.

This application is a continuation-in-part of my co-pending United States patent application Serial No. 751,-818 (filed July 18, 1958), now abandoned, which is a division of my parent United States patent application Serial No. 610,407 (filed September 17, 1956), now U.S. Patent 2,885,441 (patented May 5, 1959).

I claim:

1. A compound having the formula

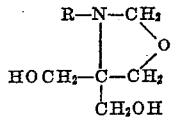

wherein R represents an alkyl group having from six to twenty carbon atoms.

2. 3-tetradecyl-4,4-bis(hydroxymethyl)oxazolidine.
3. 3-decyl-4,4-bis(hydroxymethyl)oxazolidine.
4. 3-dodecyl-4,4-bis(hydroxymethyl)oxazolidine.
5. 3-hexadecyl-4,4-bis(hydroxymethyl)oxazolidine.
6. 3-octadecyl-4,4-bis(hydroxymethyl)oxazolidine.
7. The process for preparing a compound having the formula

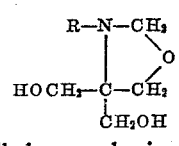

wherein R is an alkyl group having from six to twenty carbon atoms, which comprises heating an amine having the formula $RNHC(CH_2OH)_3$ and formaldehyde, with means for separating water formed in the reaction.

References Cited in the file of this patent

UNITED STATES PATENTS

| | | |
|---|---|---|
| 2,363,465 | Senkus | Nov. 21, 1944 |
| 2,744,115 | Hughes | May 1, 1956 |
| 2,885,441 | Zenitz | May 5, 1959 |
| 2,905,644 | Butter | Sept. 22, 1959 |

OTHER REFERENCES

Pierce et al.: J. Am. Chem. Soc., vol. 73, pp. 2596–2598 (1952).